(12) United States Patent
Sladen

(10) Patent No.: US 11,732,647 B2
(45) Date of Patent: *Aug. 22, 2023

(54) CENTRALIZED OIL DISTRIBUTION SYSTEM

(71) Applicant: Daniella Sladen, Miami, FL (US)

(72) Inventor: Daniella Sladen, Miami, FL (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/479,626

(22) Filed: Sep. 20, 2021

(65) Prior Publication Data

US 2022/0178304 A1  Jun. 9, 2022

Related U.S. Application Data

(63) Continuation-in-part of application No. 17/116,872, filed on Dec. 9, 2020, now Pat. No. 11,125,274.

(51) Int. Cl.
*F02C 7/36* (2006.01)
*F02C 7/06* (2006.01)

(52) U.S. Cl.
CPC .............. *F02C 7/06* (2013.01); *F02C 7/36* (2013.01); *F05D 2240/50* (2013.01); *F05D 2240/61* (2013.01); *F05D 2250/221* (2013.01); *F05D 2250/231* (2013.01); *F05D 2250/241* (2013.01); *F05D 2260/98* (2013.01)

(58) Field of Classification Search
CPC .......... F16N 7/02; F16N 9/02; F16N 2210/14; F16C 33/6681; F16C 33/00; F16C 33/66; F16C 33/6659; F02C 7/36; F05D 2240/50; F05D 2240/61; F05D 2260/98
See application file for complete search history.

(56) References Cited

U.S. PATENT DOCUMENTS

| | | | | |
|---|---|---|---|---|
| 2,212,218 A | * | 8/1940 | Whiteley | F16N 7/02 184/65 |
| 2,742,332 A | * | 4/1956 | Cobb | F16C 33/3862 384/627 |
| 3,425,759 A | * | 2/1969 | Schwarzschild | F16C 33/3713 384/492 |
| 5,320,433 A | * | 6/1994 | Kimata | F16C 33/6611 384/473 |
| 5,725,617 A | * | 3/1998 | Hagiwara | B24D 3/34 51/306 |

(Continued)

*Primary Examiner* — Michael R Mansen
*Assistant Examiner* — Mark K Buse
(74) *Attorney, Agent, or Firm* — Sanchelima & Associates, P.A.; Christian Sanchelima; Jesus Sanchelima

(57) ABSTRACT

An oil distribution system including a shaft assembly, bearing assembly and mounting assembly is disclosed. The shaft assembly includes a shaft with an inner shaft. A pocket is defined between the shaft and the inner shaft. A ringed lattice containing oil is secured within the pocket, melting of the ringed lattice releases the oil. The shaft includes shaft slots to usher oil from the pocket towards the bearing assembly. The bearing assembly includes an inner and outer race. The inner and outer race each include axial slots and radial slots. The axial slots of the inner race align with the shaft slots to allow oil to flood the inner race. The mounting assembly includes a bearing support having bearing support slots to receive a stringed lattice. Oil from the bearing support flows into the outer race when the axial slots of the outer race align with the bearing support slots.

20 Claims, 18 Drawing Sheets

(56) References Cited

U.S. PATENT DOCUMENTS

| | | | |
|---|---|---|---|
| 8,672,555 B2* | 3/2014 | Gardelle | F16C 33/6648 |
| | | | 384/473 |
| 9,371,498 B2* | 6/2016 | Bongaerts | F16N 7/12 |
| 11,125,274 B1* | 9/2021 | Sladen | F16C 33/6681 |
| 2015/0159112 A1* | 6/2015 | Strandell | F16G 13/00 |
| | | | 508/110 |
| 2015/0252851 A1* | 9/2015 | Tate | F16C 19/305 |
| | | | 29/898.1 |
| 2019/0186691 A1* | 6/2019 | LaBerge | F16N 25/00 |

* cited by examiner

CENTRALIZED OIL DISTRIBUTION SYSTEM

OTHER RELATED APPLICATIONS

The present application is a continuation-in-part of pending U.S. patent application Ser. No. 17/116,872, filed on Dec. 9, 1920, which is hereby incorporated by reference.

BACKGROUND OF THE INVENTION

1. Field of the Invention

The present invention relates to a centralized oil distribution system, more particularly, to an oil distribution system that selectively delivers and disperses oil to the engine of vehicles, such as aircrafts, for proper function of the engine, eliminating the need to maintain oil circulating through the engine.

2. Description of the Related Art

Several designs for oil distribution systems have been designed in the past. None of them, however, include a shaft and a bearing support which receives a lattice within. The lattice includes pods containing oil to be delivered to the engine of machinery or vehicles. The lattice and each individual pod disintegrate or burst at a predetermined temperature to selectively deliver and disperse oil within the engine for proper function thereof. Supported between the shaft and the bearing support is a bearing with bearing races. The shaft, bearing races and the bearing support include slots that allow for the oil to maneuver through the engine for lubrication of the necessary components within. Thereby resulting in reduced engine costs, weight and complexity as there are less components necessary to deliver oil to the engine as the need for oil to be constantly circulating through the engine is eliminated.

Applicant believes that a related reference corresponds to U.S. Pat. No. 2,742,332 for bearings and lubrication therefor. Applicant believes that another related reference refers to U.S. Pat. No. 9,371,498 for a lubricant system and method of forming the same. None of these references, however, teach of a lattice secured within an engine, more particularly at a shaft and bearing support of the engine, which disintegrates at a predetermined temperature to deliver oil to the engine for lubrication to permit proper functioning thereof. The oil is distributed through the shaft, bearing races and bearing support of the engine through slots that allow the oil to flow freely through the shaft, bearing races and bearing support for lubrication.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an oil distribution system that selectively delivers and distributes oil within an engine of a machinery or vehicle, when a predetermined temperature is achieved within the engine for proper function thereof.

It is another object of this invention to provide an oil distribution system that eliminates the need to have constant flowing oil through an engine of a vehicle or machinery.

It is still another object of the present invention to provide an oil distribution system that reduces the weight, complexity and cost of an engine for a vehicle or machinery.

It is also another object of the present invention to provide an oil distribution system that permits for vehicles and machinery with engines to be easily disposable.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
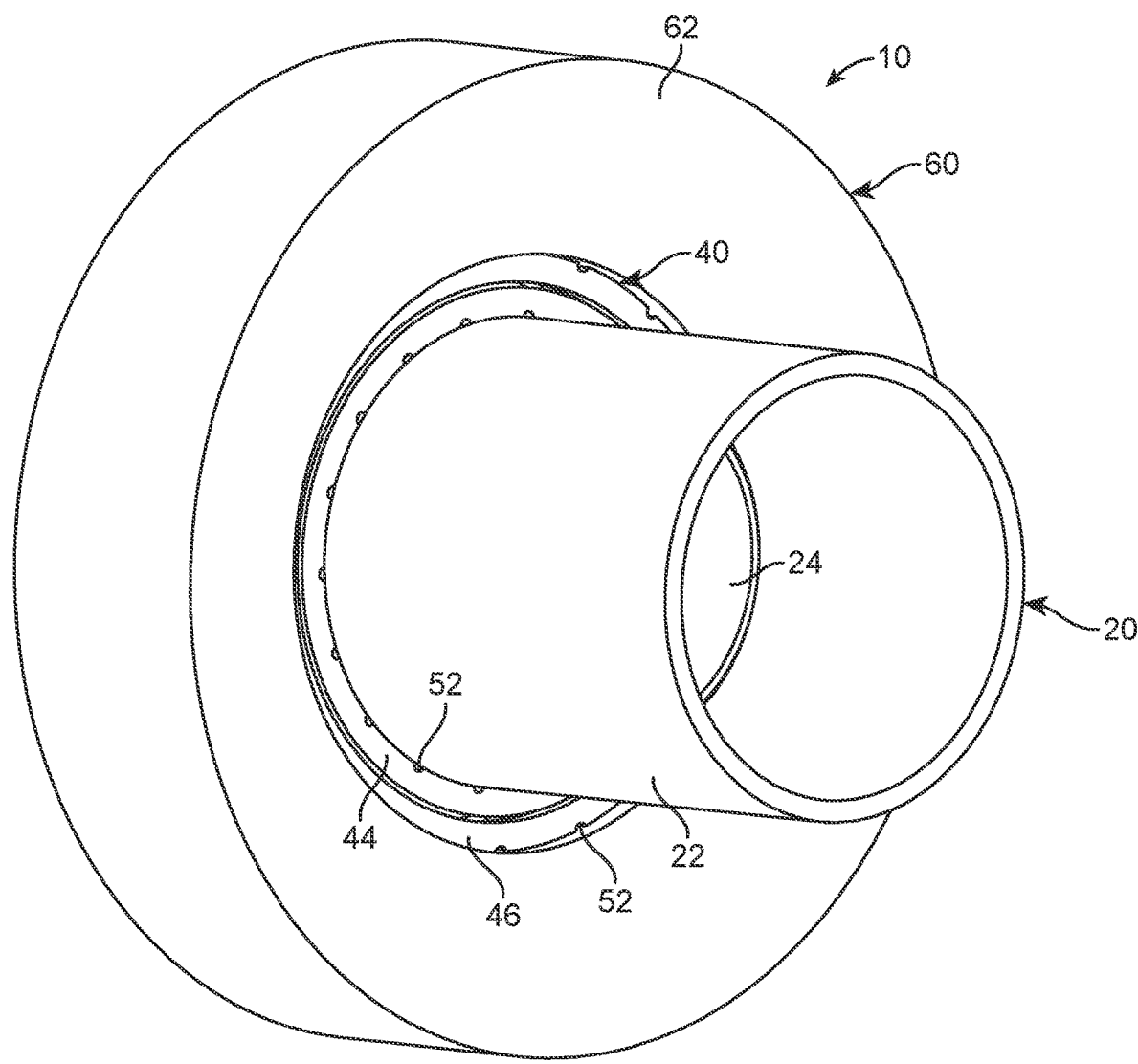
FIG. 1 represents an isometric view of the oil distribution system 10 in one embodiment.
Figure 2:
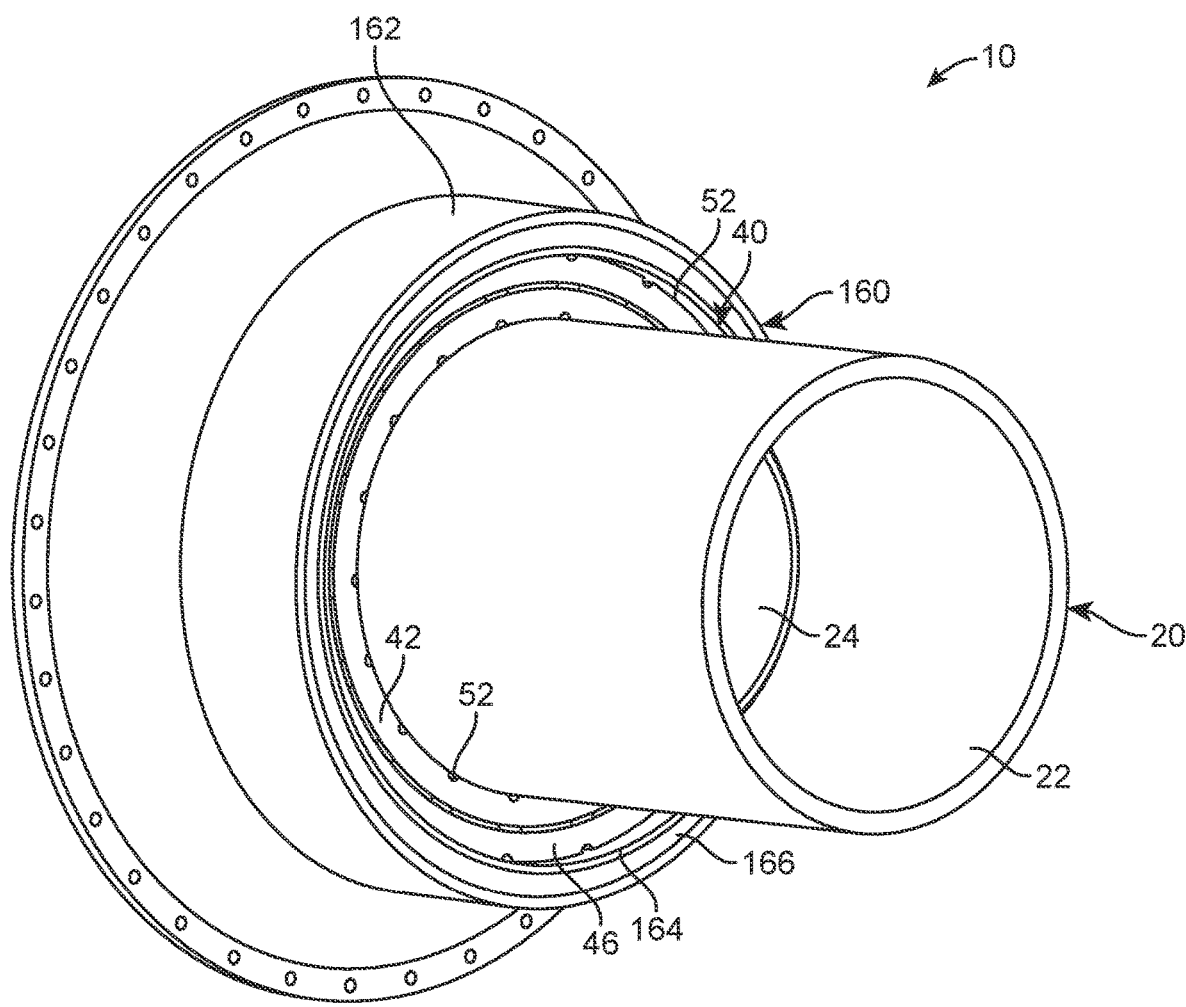
FIG. 2 shows an isometric view of the oil distribution system 10 in an alternate embodiment.
Figure 3:
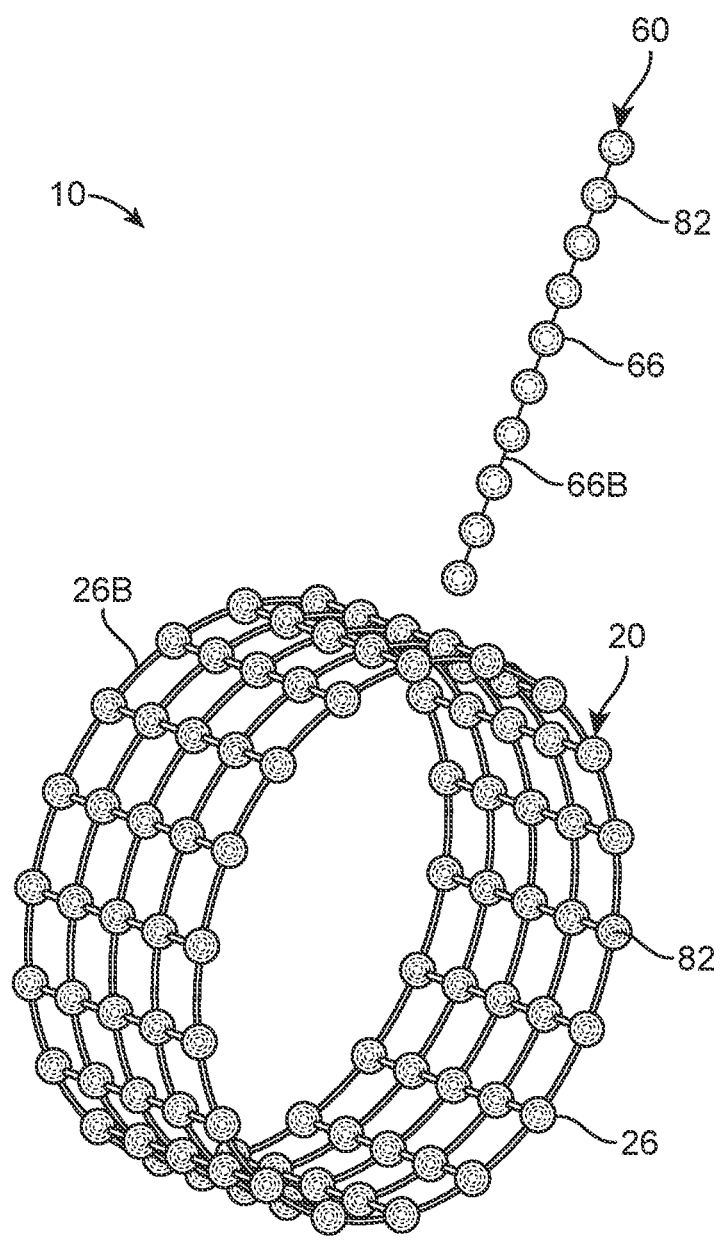
FIG. 3 illustrates an isometric view of the ringed lattice member 26 and the stringed lattice member 66, in one implementation of the present invention.
Figure 4:
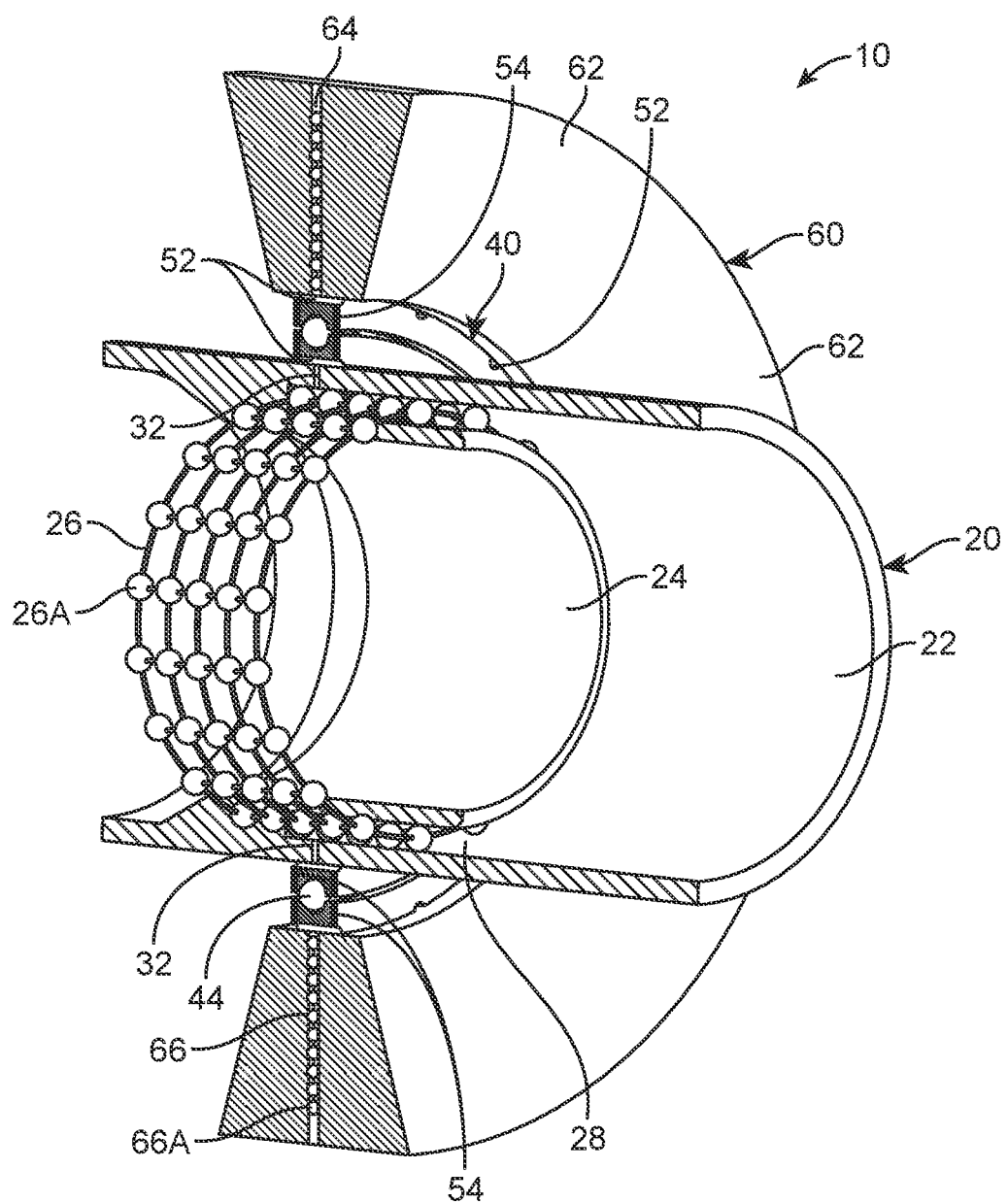
FIG. 4 is a representation of a cross-sectional view of oil distribution system 10 in one embodiment.
Figure 5:
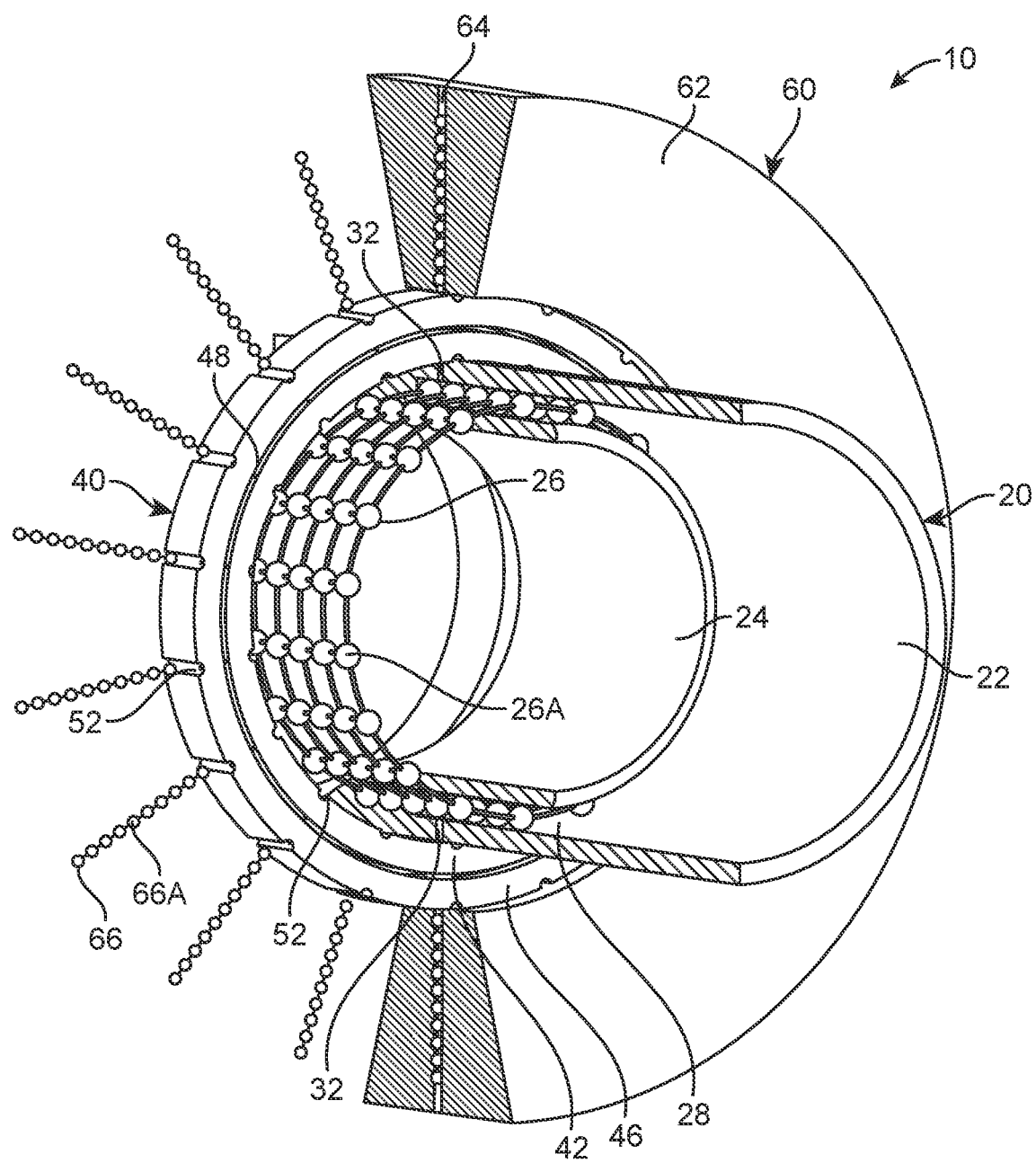
FIG. 5 represents a partial cross-sectional view of oil distribution system 10 in one embodiment.

Referring now to the drawings, where the present invention is generally referred to with numeral 10, it can be observed that it basically includes a shaft assembly 20, a bearing assembly 40 and a mounting assembly 60.

Oil distribution system 10 may help to deliver lubricants such as oils to a motor of a vehicle or other machinery to allow the motor to function properly and as needed. Oil distribution system 10 eliminates the need for the lubricants or oils to be constantly circulating through the motor. Instead, the lubricants or oils are selectively dispersed into the motor to allow proper functioning thereof. This helps to reduce the complexity, cost and weight of the motors as the need for components that permit the oils to be constantly flowing through the motor are eliminated. Additionally, the machinery or vehicles which have oil distribution system 10 incorporated within may be easily disposed of. Oil distribution system 10 may be implemented into drones used for warfare which may not so easily survive, for example.

Oil distribution system 10 includes shaft assembly 20 having a shaft 22 and can include a concentric inner shaft 24 within. It may be suitable for concentric inner shaft 24 to extend a partial length of shaft 22. A ringed lattice member 26 can be wrapped around concentric inner shaft 24 thereby holding ringed lattice member 26 in place within shaft 22. Shaft 22 and concentric inner shaft 24 may each have a cylindrical configuration in the preferred embodiment. The distance between shaft 22 and concentric inner shaft 24 defines a pocket 28 within shaft 22 that may serve as a reservoir for oil 82 resulting from the heating of ringed lattice member 26. It is to be understood that oil 82 may escape from pocket 28 through shaft slots 32 located about the perimeter of shaft 22. Shaft slots 32 may be in fluid communication with pocket 28. It is to be understood that ringed lattice member 26 may melt at a temperature of at least 130 degrees Fahrenheit.

It is to be understood that at least one of ringed lattice member 26 may be inserted within shaft 22. It is to be understood that each of ringed lattice member 26 may include ringed lattice pods 26A which are attached together with ringed lattice connectors 26B. Ringed lattice connectors 26B may extend between each of ringed lattice pods 26A. Preferably, ringed lattice connectors 26B may extend perpendicularly from each of ringed lattice pods 26A. Notably, within each of ringed lattice pods 26A may be encapsulated oil 82. Oil 82 may be injected into ringed lattice pods 26A in one embodiment. Oil 82 may suitably be a lubricant such as motor oil. In an alternate embodiment, ringed lattice pods 26A may be free from one another.

Importantly, ringed lattice member 26 may disintegrate with heat. Ringed lattice member 26 may disintegrate when a predetermined temperature is reached within shaft 22 to release oil 82 held within. Thereby allowing for oil 82 to be dispersed within the engine to lubricate bearing assembly 40 for proper functioning thereof. When ringed lattice member 26 melts, more specifically ringed lattice pods 26A, oil 82 may be momentarily stored within pocket 28. Oil 82 may escape from pocket 28 through shaft slots 32. Shaft slots 32 may extend about an entire perimeter of shaft 22. It may be suitable for shaft slots 32 to be skewed relative to shaft 22 at a predetermined angle. Shaft slots 32 may usher oil 82 within pocket 28 out of shaft 22 and towards bearing assembly 40. In a preferred embodiment, shaft slots 32 extend from pocket 28 to bearing assembly 40. Multiple shaft slots 32 can be located around shaft 22 that cooperate with various receiving locations of bearing assembly 40. It may be suitable to access pocket 28 from front or rear of shaft 22. Pocket 28 may have a depth that extends partially along the length of shaft 22.

The engine of machinery or vehicles is powered by combustion. A turbine within the engine is actuated as a result of that combustion, the turbine then drives shaft 22. Shaft 22 rotates within bearing assembly 40. It is to be understood that bearing assembly 40 extends about the entire perimeter of shaft 22. Bearing assembly 40 includes inner race 42 that extends along the inner circumference of bearing assembly 40. Bearing assembly 40 also includes an outer race 46 that extends along the outer circumference of bearing assembly 40. It is to be understood that a spacing 48 exists between inner race 42 and outer race 46. Spacing 48 is formed by the separation between inner race 42 and outer race 46. Inner race 42 is connected to shaft 22 using a press fit and both spin simultaneously at the same rate. The axial and radial forces from shaft 22 are therefore transmitted to inner race 42. Bearing elements 44 extend along the circumference of bearing assembly 40 and are rotating with inner race 42 that rotates around the shaft 22. Bearing elements 44 may be ball bearings or rollers, for example. Bearing elements 44 are also spinning about their own axis. Bearing elements 44 absorb radial and axial forces transmitted on inner race 44 thereby also absorbing radial and axial forces from shaft 22. This absorption of those two forces by bearing elements 44 keeps shaft 22 aligned in place when the engine is in operation. Inner race 42 rotates while outer race 46 is static during engine operation. In one embodiment, outer race 46 is mounted to mounting assembly 60 using press fit or any other method of mounting bearing assembly 40 to the engine casing. In another embodiment, outer race 46 can be mounted to a location on the engine casing using an intermediary member such as a bearing support member. Bearing elements 44 are within a bearing cage and both move together at the same rate. The bearing cage ensures appropriate spacing between the bearing elements 44 within bearing assembly 40.

Figure 9:
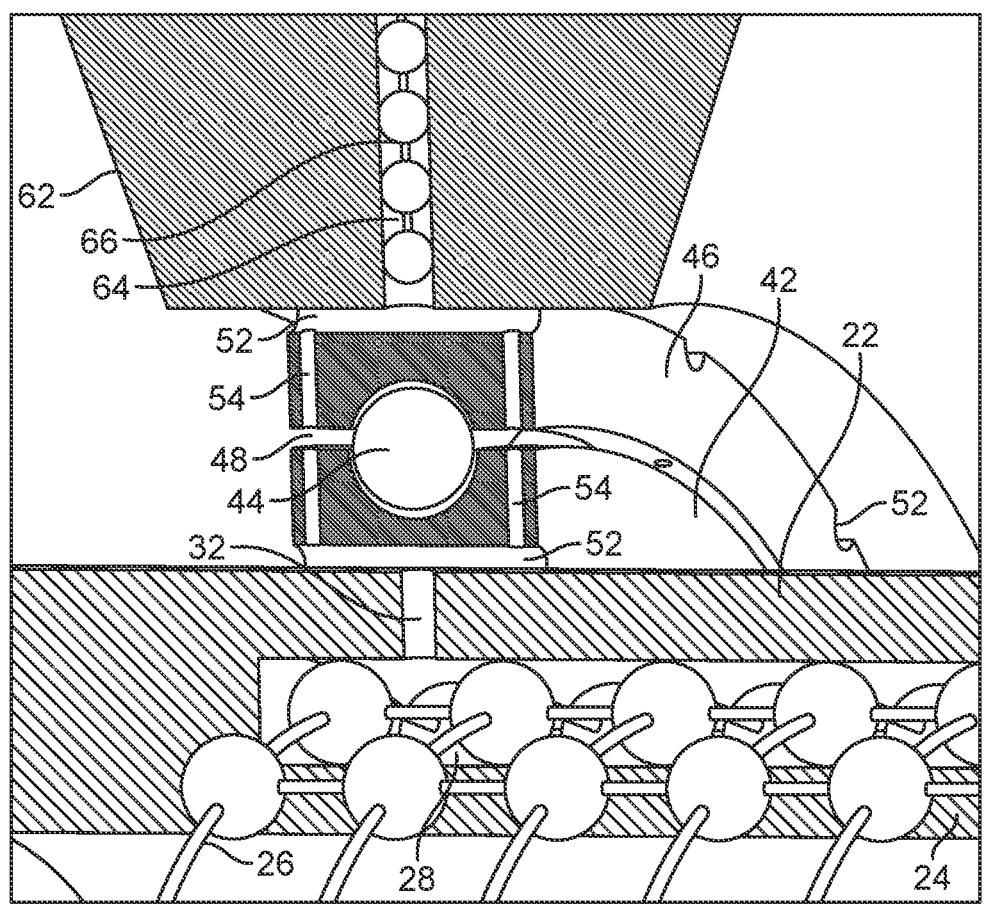
FIG. 9 is a zoomed in cross-sectional view of oil distribution system 10 showing the axial slots 52 and the radial slots 54, in one implementation of the present invention.

Each of inner race 42 and outer race 46 may include axial slots 52 and radial slots 54. Axial slots 52 of inner race 42 may extend evenly spaced apart about the inner circumference of inner race 42. Axial slots 52 of outer race 46 may extend evenly spaced apart about the outer circumference of outer race 46. Axial slots 52 may be recessed in each of inner race 42 and outer race 46. Axial slots 52 on inner race 42 may be parallel to axial slots 52 on outer race 46 when inner race 42 and outer race 46 align. Axial slots 52 may extend a thickness of each of inner race 42 and outer race 46. Extending perpendicularly from each of axial slots 52 towards spacing 48 may be radial slots 54. Radial slots 54 may extend internally within each of inner race 42 and outer race 46. Radial slots 54 may be on opposite lateral sides of each of axial slots 52 and be perpendicular to axial slots 52. It is to be understood that shaft slots 32 may align with axial slots 52 on inner race 42. Thereby allowing for oil 82 within pocket 28 to flow from shaft 22 through shaft slots 52 and into inner race 42 through axial slots 52. Oil 82 may then continue to flow from inner race 42 towards spacing 48 and eventually towards outer race 46. Additionally, bearing elements 44 are also lubricated when bearing assembly is flooded with oil 82. Axial slots 52 and radial slots 54 assist oil 82 in flowing though through bearing assembly 40 for lubrication thereof. Axial slots 52 and radial slots 54 may be best illustrated in FIG. 9. It is to be understood that axial slots 52 on both of inner race 42 and outer race 46 can be open on one or both sides to allow more of oil 82 to be distributed through the system. Alternatively, axial slots 52 on inner race 52 and outer race 54 can be closed on both sides to direct the flow of oil 82.

Secured about the perimeter of bearing assembly 40 may be mounting assembly 60. Mounting assembly may assist bearing assembly 40 in remaining intact and functioning as needed. Mounting assembly 60 may include an intermediary member such as a bearing support 62. Bearing support 62 may extend about the entire perimeter of bearing assembly 40. Shaft 22 and inner race 42 may rotate while outer race 46 and bearing support 62 remain stationary during the operation of the present invention. It is to be understood that bearing support 62 may include bearing support slots 64. Bearing support slots 64 may be evenly spaced apart and each extend a towards a center of bearing support 62. It may be suitable for bearing support slots 64 to be closed on at least one end, in one embodiment. It may also be suitable for bearing support slots 64 to be open on both ends, in an alternate embodiment. Bearing support slots 64 may be parallel to each other. It is to be understood that within bearing support slots 64 may be received a stringed lattice member 66. Each of bearing support slots 64 may receive at least one of string lattice member 66. It is to be understood that each of stringed lattice member 66 may include a stringed lattice pods 66A secured together with stringed lattice connectors 66B similarly to ringed lattice pods 26A and ringed lattice connectors 26B. It is to be understood that stringed lattice member 66 may be similar to ringed lattice member 26 and hold oil 82 within. Stringed lattice member 66 may have stringed lattice pods 66A arranged in a column configuration. Stringed lattice member 66 may melt to release oil 82 through bearing support slots 64 down into bearing assembly 40. Bearing support slots 64 align with axial slots 52 located on outer race 46. As outer race 46 and bearing support 62 are stationary, axial slots 52 on outer race 46 are constantly aligned with bearing support slots 64. Thereby allowing for oil 82 from bearing support 62 to flow into outer race 46 and towards spacing 48 for lubrication of bearing assembly 40. Bearing assembly 40 may be flooded by oil 82 from shaft 22 and from bearing support 62 for proper functioning of the engine of the machinery or vehicles. It is to be understood that stringed lattice member 66 may melt at a temperature of at least 130 degrees Fahrenheit.

Figure 6:
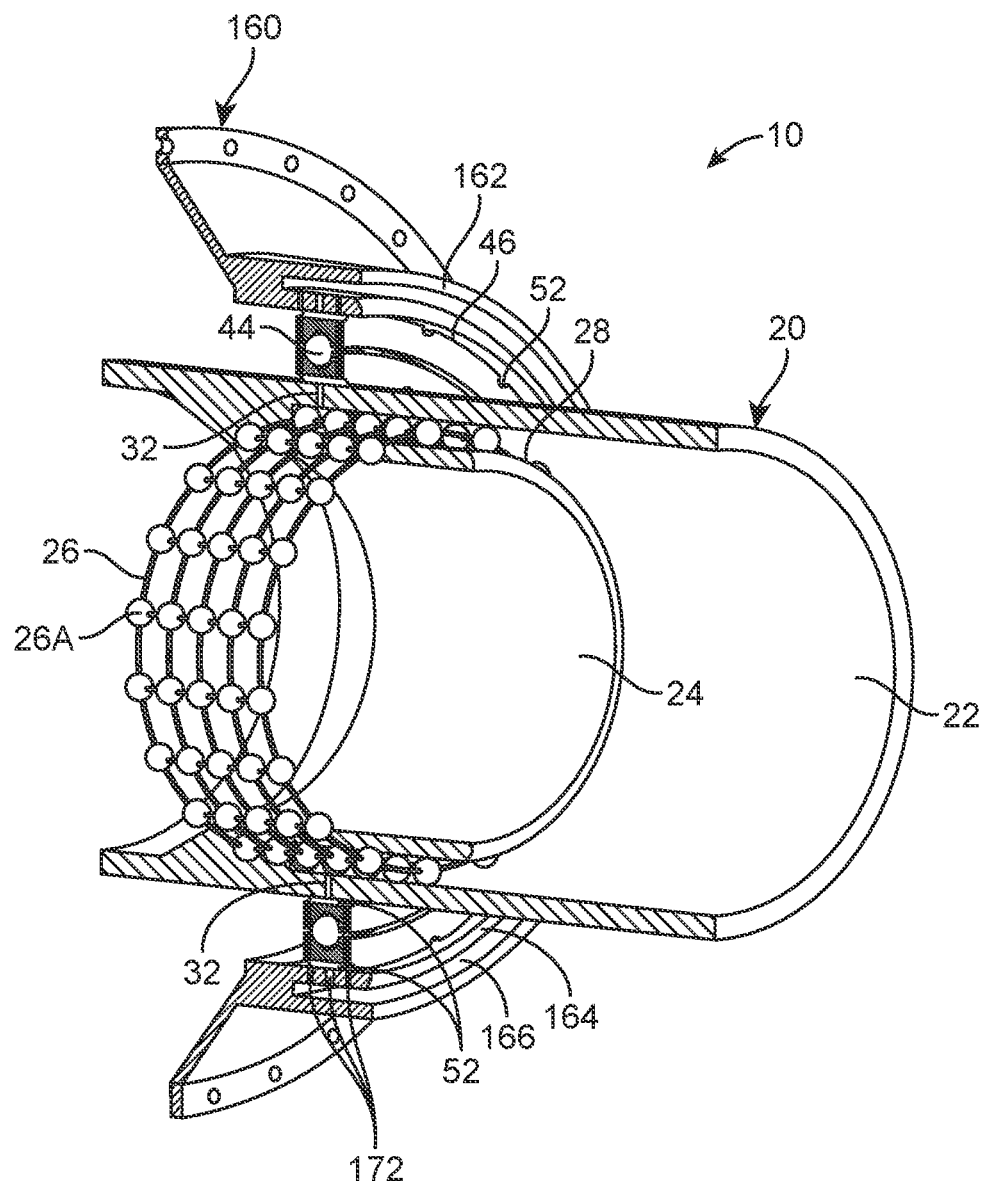
FIG. 6 show a partial cross-sectional view of oil distribution system 10 in an alternate embodiment.
Figure 7:
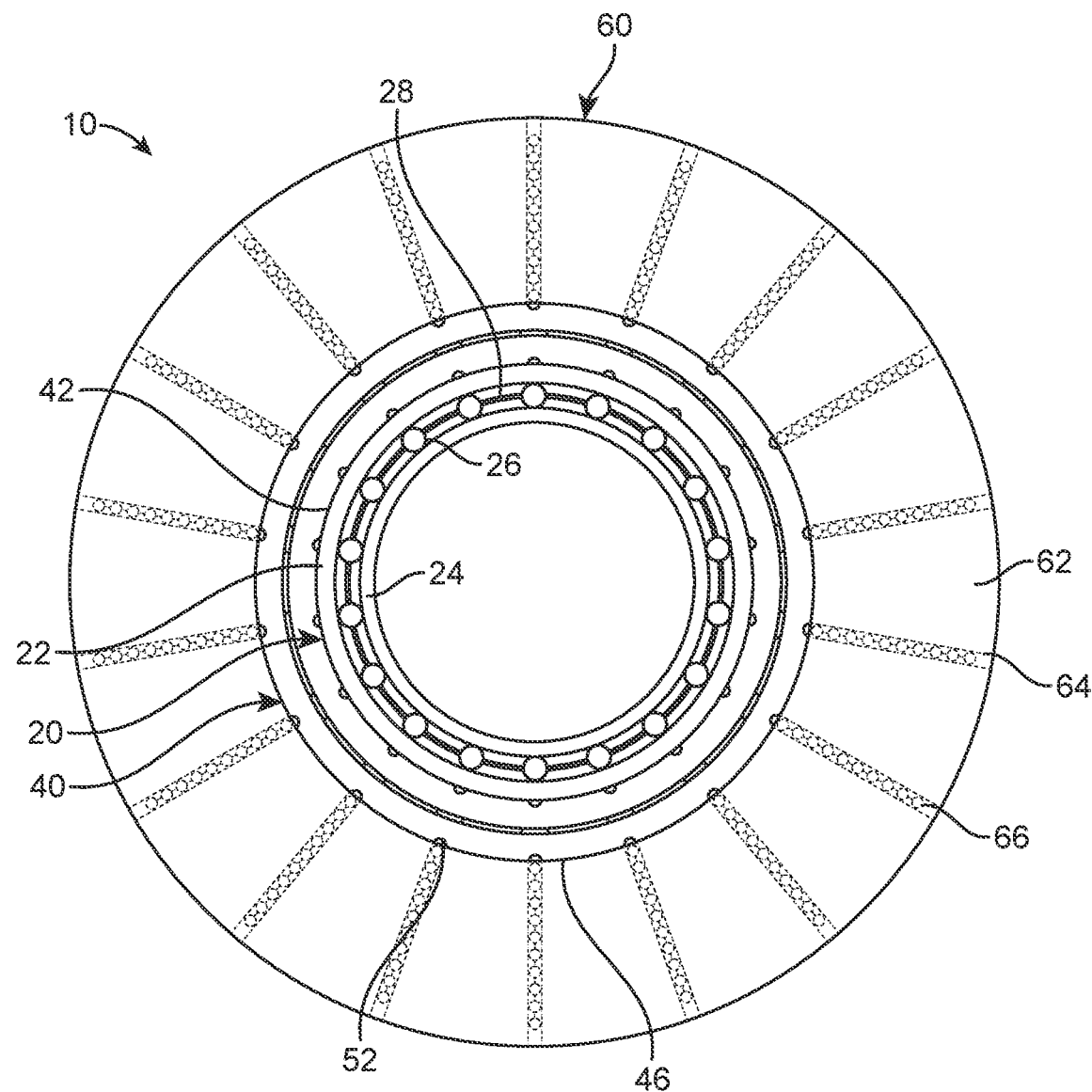
FIG. 7 illustrates a front view of oil distribution system 10 in one embodiment.
Figure 8:
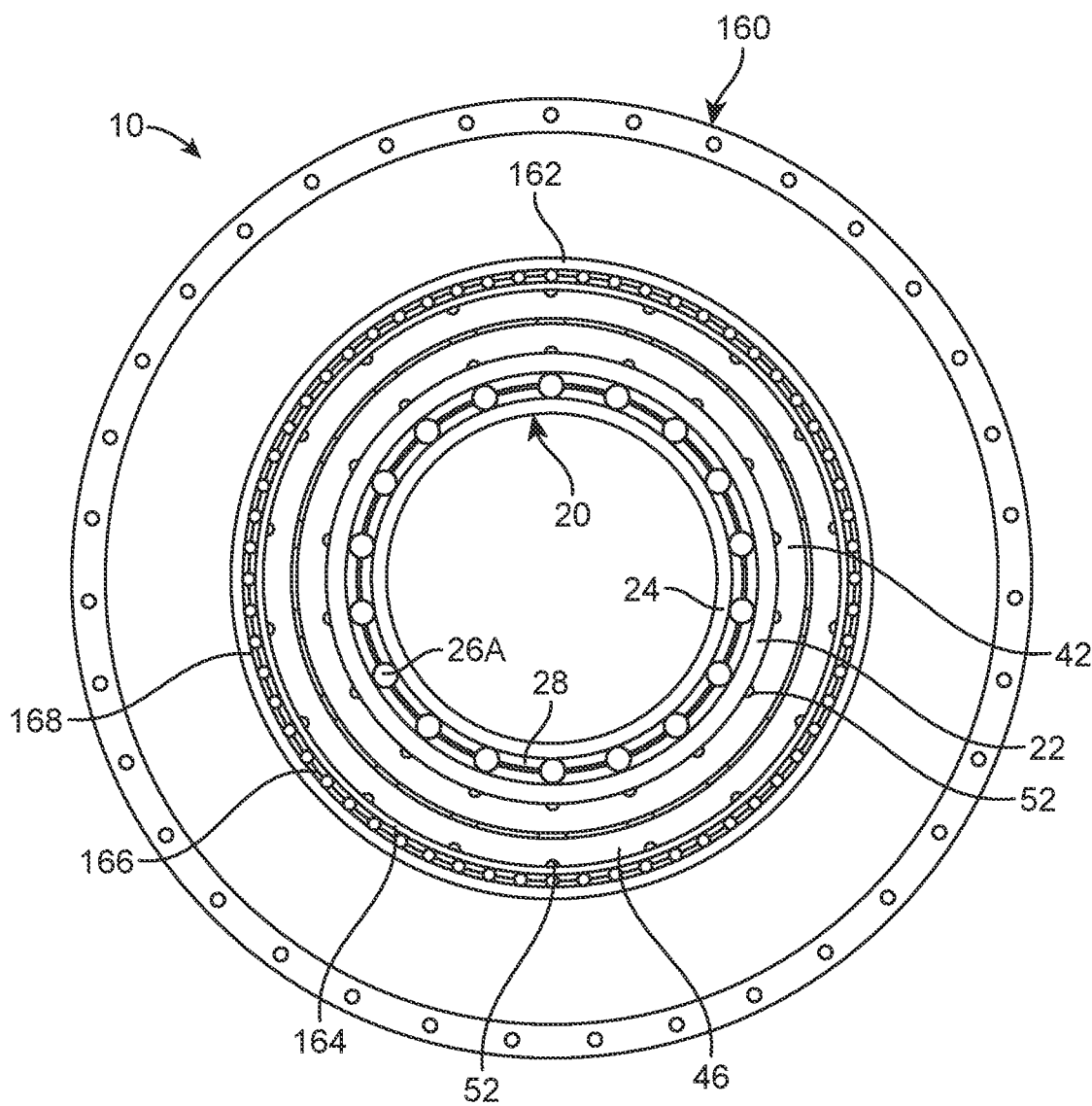
FIG. 8 is a representation of a front view of oil distribution system 10 in an alternate embodiment.

In an alternate embodiment, as seen in FIGS. 6 and 8, secured about the entire perimeter of bearing assembly 40 may be a mounting assembly 160. Mounting assembly 160 may include a bearing support 162 having a bearing support inner member 164 within. Bearing support 162 may include a bearing support pocket 166 therein. Bearing support pocket 166 may be defined as the distance between bearing support 162 and bearing support inner member 164. Bearing support pocket 166 may extend about an inner perimeter of bearing support 162. It can be seen that bearing support pocket 166 may be recessed within bearing support 162. Secured within bearing support pocket 166 may be a ringed bearing support lattice member 168. Ringed bearing support lattice member 168 may be similar to ringed lattice member 26. It may be suitable for ringed bearing support lattice member 168 to have dimensions greater than ringed lattice member 26, in one embodiment. Ringed bearing support lattice member 168 may melt at a temperature of at least 130 degrees Fahrenheit.

Importantly, bearing support inner member 164 may include bearing support slits 172, as illustrated in FIG. 6, in fluid communication with bearing support pocket 166. Bearing support slits 172 may be located along the perimeter of bearing support inner member 164. Bearing support slits 172 may be adjacent and parallel to each other, as seen in FIG. 6. Bearing support slits 172 may be skewed at a predetermined angle relative to bearing support pocket 166. Bearing support slits 172 may align with axial slots 52 on outer race 46, allowing for oil 82 dispersed from ringed bearing support lattice member 168 to flow out of bearing support pocket 166 through bearing support slits 172 into outer race 46 and towards inner race 42 and spacing 48. As outer race 46 and bearing support 162 are stationary, axial slots 52 of outer race 46 are in constant alignment with bearing support slits 172. Thereby allowing for bearing assembly 40 to be flooded with oil 82 for proper lubrication and function of the present invention.

Oil distribution system 10 is capable of selectively distributing oil 82 to the engine of vehicles or machinery for the proper lubrication thereof. Thereby allowing for the vehicle or machinery including oil distribution system 10 to not have to have oil 82 constantly flowing therethrough. This helps to reduce the cost and weight of the machinery or vehicles produced and their respective motors. Advantageously, the machinery or vehicle may be made disposable due to the reduced costs.

Figure 10:
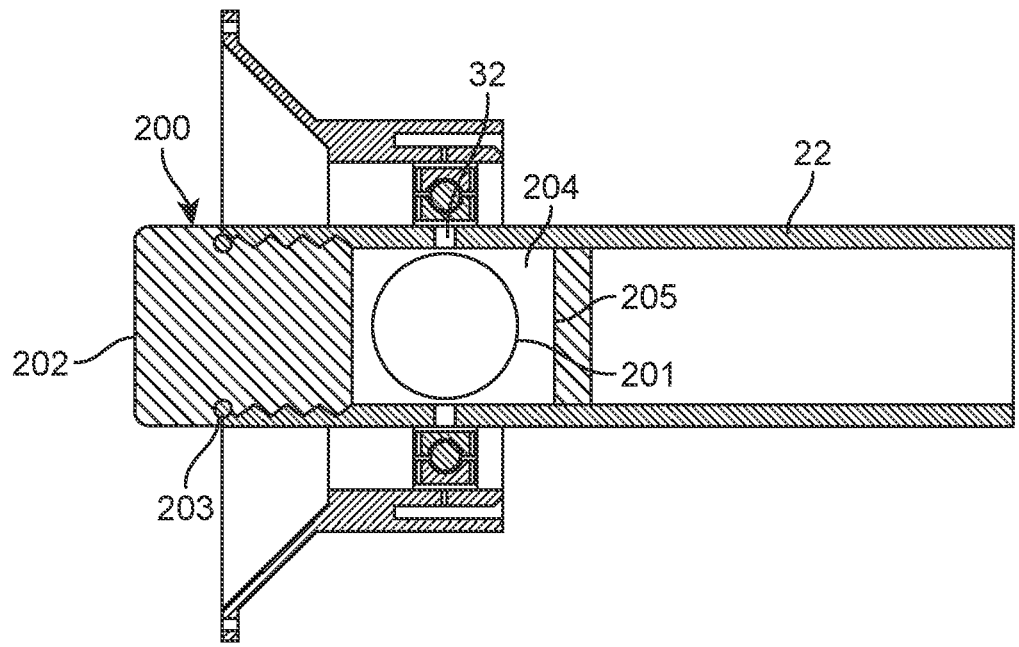
FIG. 10 is a cross sectional side view demonstrating an alternate embodiment of the shaft 22. Wherein the shaft 22 includes a cap 202 at a distal end to hold a pod 201 within a tank 204. The tank 204 defined by the spacing between the end of the cap 202 and the wall 205.
Figure 11:
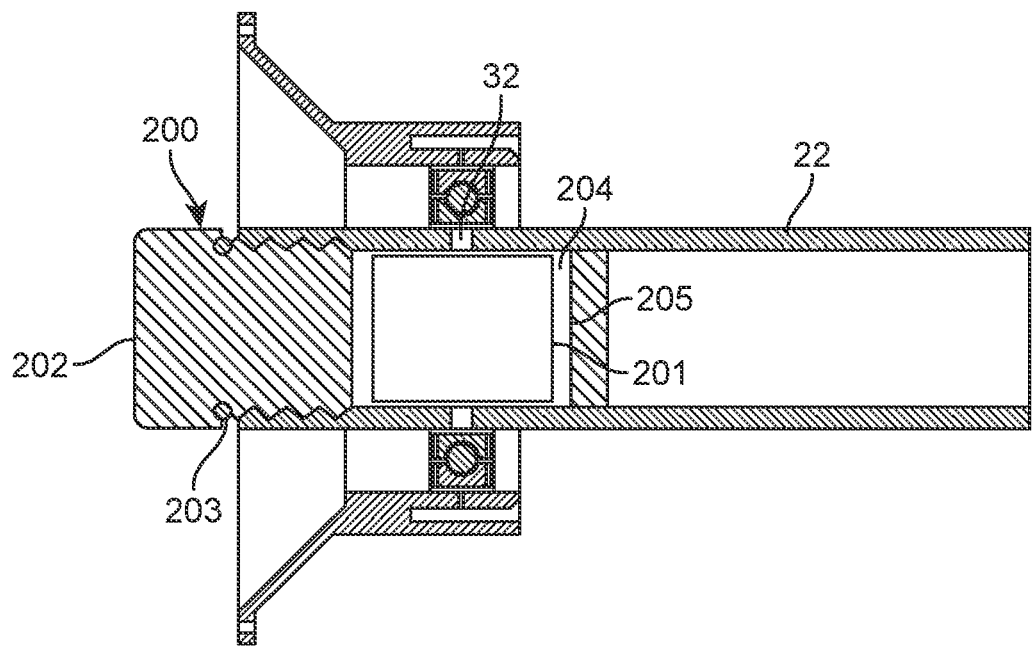
FIG. 11 shows a cross sectional side view of an alternate embodiment of pod 201 having a cylindrical shape held within the tank 204 of the shaft 22.
Figure 12:
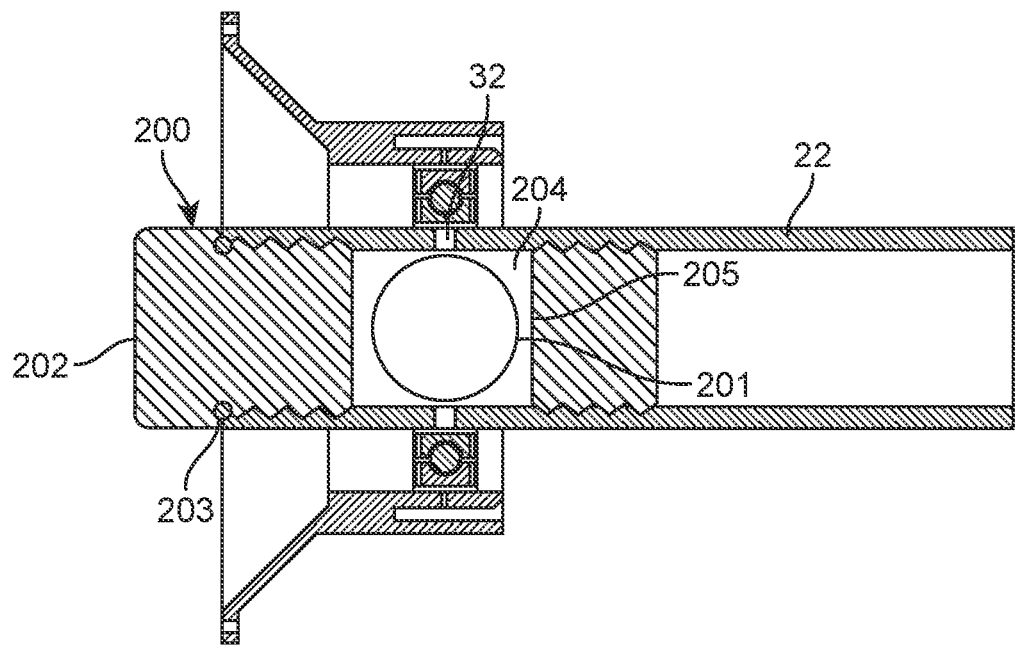
FIG. 12 depicts a cross sectional side view of an alternate embodiment of the wall 205. Wherein the wall 205 includes ridges that engage with an interior perimeter edge of the shaft 22.
Figure 13:
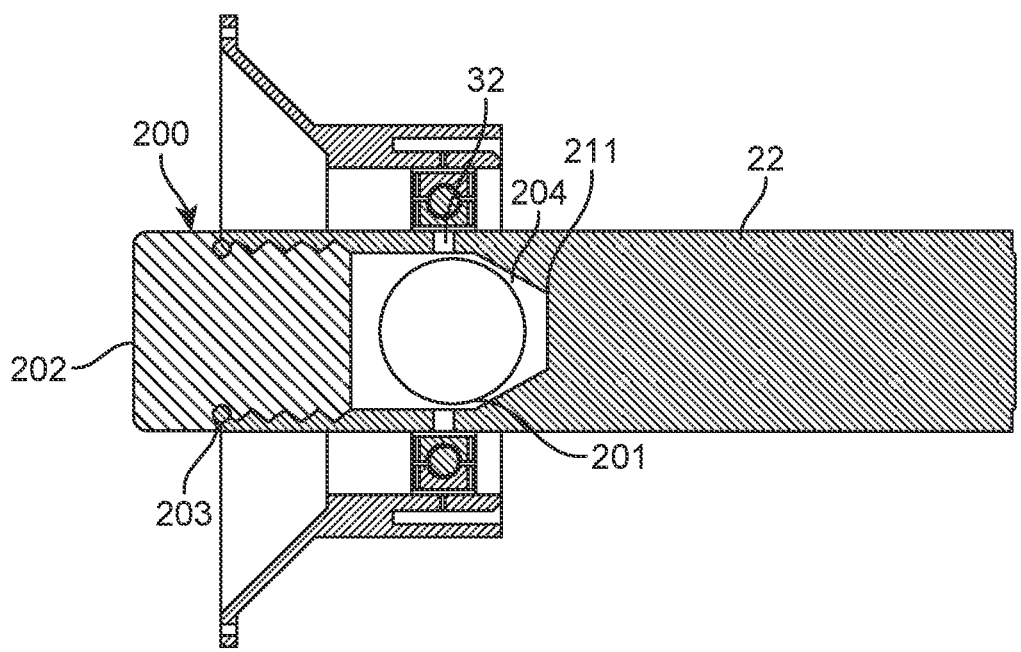
FIG. 13 is a cross sectional side view of an alternate embodiment of the shaft 22. The shaft 22 including a tank wall 211 that is integrally formed within said shaft 22.
Figure 14:
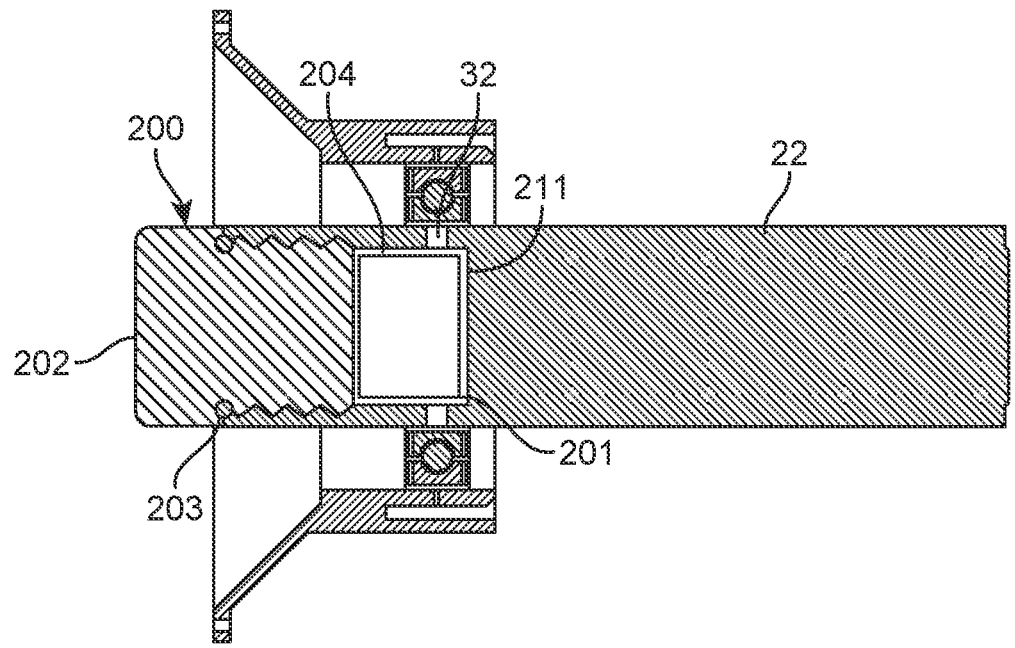
FIG. 14 represents a cross sectional side view of an alternate embodiment of the shaft 22. The shaft 22 including a tank wall 211 with a portion that cooperates with the pod 201 having a cylindrical shape.

In an alternate embodiment, best illustrated in FIG. 10, the shaft 22 may be a hollow tube that includes a cap 202 of pod assembly 200. In multiple and subsequent embodiments, it may be suitable for the shaft 22 to be operatively engaged with a turbine. Wherein the turbine provides the shaft 22 with a rotational force at predetermined values of revolutions per minute (RPM). The rotational force or RPMs exhibited by the shaft 22 may allow for a positive correlation between the RPMs and varying viscosities for oils 82 that can be used within the present invention 10. The rotation of the shaft 22 has the added benefit of repurposing said shaft 22 to be used as an oil distribution system. The cap 202 may be a cylindrical member that includes a threaded portion. Wherein said threaded portion engages with a distal end of the shaft 22. The cap 202 may include a cap portion that has a diameter greater than a diameter of said threaded portion. It may be suitable for the cap 202 to include a seal 203. The seal 203 may be an annular gasket that surrounds a threaded portion end. The seal 203 being entirely between the distal end of the shaft 22 and a cap bottom. Said seal 203 may help prevent oil 82 from being unintentionally expelled from the shaft 22 to a shaft exterior. In one embodiment, the shaft 22 may include a wall 205. The wall 205 may be oppositely located with respect to the cap 202 within the shaft 22. The wall 205 may include multiple iterations. Wherein said wall 205 is mounted within the shaft via welding or adhesively. It may be suitable for the shaft 22 include an integrally formed tank wall 211. Said tank wall 211 may include a chamfered portion. The chamfered portion of one embodiment of the tank wall 211 allowing for a pod 201 to be received therein. The cap 202 and the wall 205, or the cap 202 and the tank wall 211, each being in a spaced apart relationship and thereby defining a tank 204 within the shaft 22. The tank 204 may be used as an enclosure for the pod 201.

Figure 19:
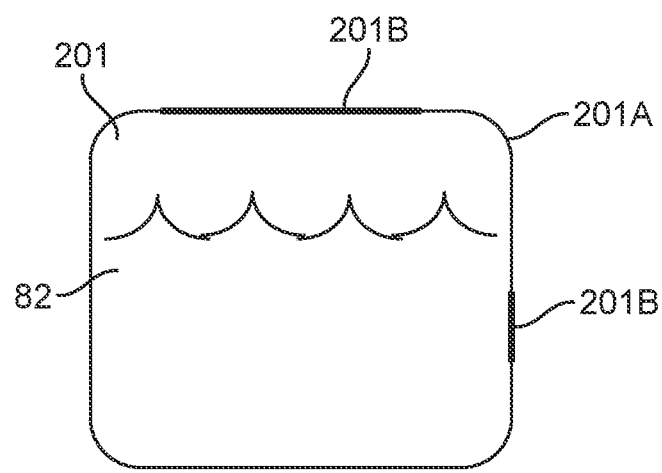
FIG. 19 is a cross sectional side view of an embodiment of pod 201. The pod 201 having a cubic shape defined by a membrane 201A. The membrane 201A including a reactive membrane 201B. The reactive membrane 201B may be made of material with a lower melting point than that of membrane 201A. Thereby facilitating the expulsion of oil 82 contained within the pod 201 in the direction of the reactive membrane 201B.

The pod 201 may be a capsule that includes a membrane 201A. The pod 201 may serve as a container for the oil 82. The oil 82 encased within the membrane 201A may be expelled when a predetermined temperature is reached. The predetermined temperature may be achieved through the rotation of the shaft 22 at a predetermined value of RPMs. The predetermined temperature may melt the membrane 201A to expel the oil 82 stored therein. In multiple iterations, the pod 201 may be spherical, cylindrical or cubic. Shown in FIG. 19, the membrane 201A may further include a reactive membrane 201B. Said reactive membrane 201B may be made of a material with a lower melting temperature than that of the melting temperature for the membrane 201A. The lower melting temperature of the reactive membrane 201B may allow for the oil 82 to be expelled from the pod 201 in the direction of said reactive membrane 201B. Once expelled from the pod 201, the oil 82 may subsequently travel to an exterior of the tank 204 via the shaft slots 32. It may be suitable for the oil 82 to be pumped to the exterior of the tank 204 through the use of centrifugal forces obtained from the rotation of the shaft 22. Thereby leveraging the centrifugal forces to disperse the oil 82 and lubricate the bearing element 44 of the bearing assembly 40. In one embodiment the shaft slots 32 may be a series of through holes circumferentially surrounding the tank 204.

Figure 18:
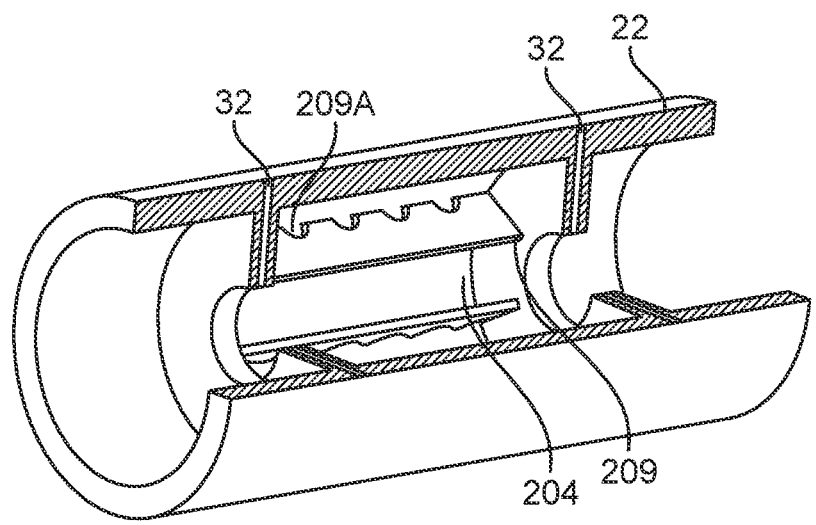
FIG. 18 is a partial cross sectional view of an alternate embodiment of the shaft 22. Wherein the shaft 22 includes fins 209. The fins 209 further including fin apertures 209A to allow for the agitation of oil contained therein.

In one embodiment, best illustrated in FIG. 18, the shaft 22 may include fins 209. The fins 209 being longitudinally mounted within the interior of the shaft 22. The fins 209 may be flattened rectangular members with fin apertures 209A located about a fin edge that is in abutting contact to the interior of the shaft 22. The fin apertures 209A may be a series of U-shaped openings. The fins 209 in conjunction with the fin apertures 209A may help agitate the oil 82. The agitation of the oil 82 may prevent said oil 82 from exhibiting non-Newtonian fluid properties which can occur should the rotational speed of the shaft 22 reaches a predetermined amount of revolutions per minute.

Figure 23:
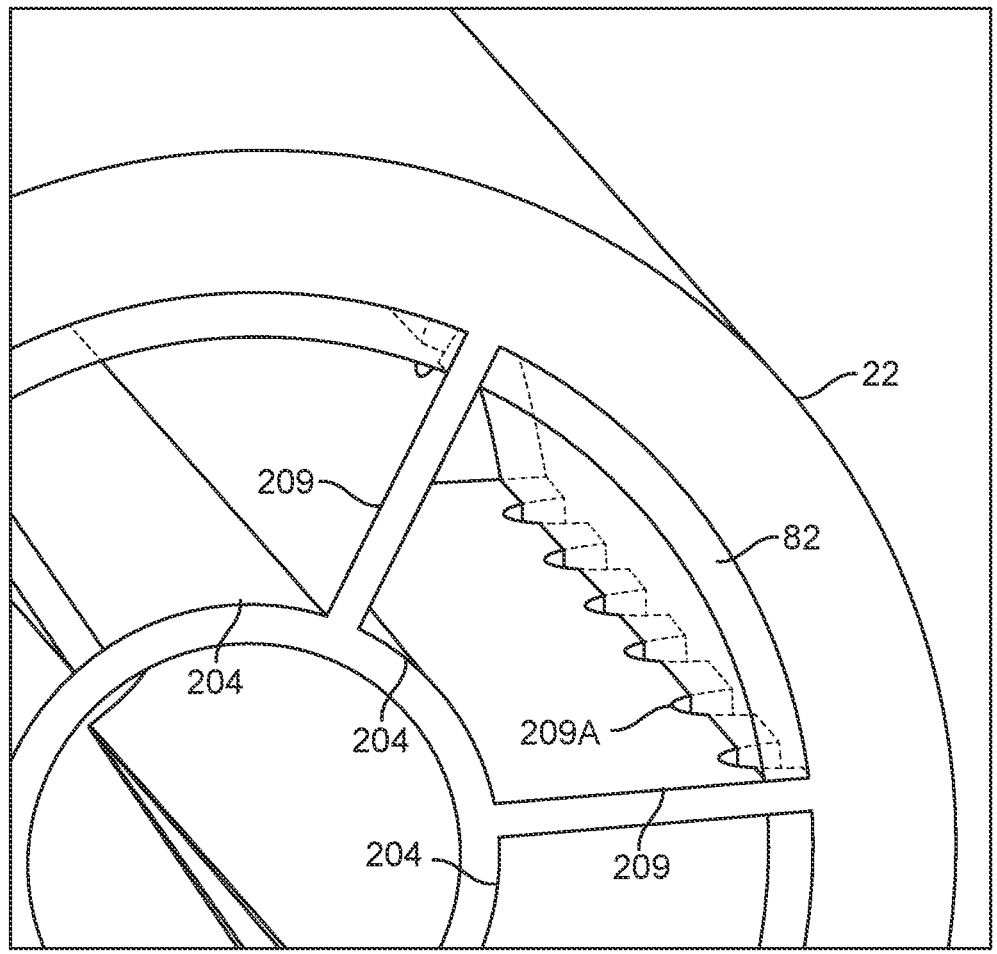
FIG. 23 represents a cross sectional front view of one embodiment of the shaft 22. The oil 82 is shown flowing through tanks 204 via the fin apertures 209A. The fin apertures 209A are essential for the redistribution of oil 82 to prevent rotational imbalances that may occur in the shaft 22.

As illustrated in FIG. 23 it may be suitable for the tanks 204 to be equally spaced and circumferentially disposed in plurality about an interior portion of the shaft 22. The perimeter of the tanks 204 may be defined by the fins 209 also disposed within the shaft 22. The fin apertures 209A located on the fins 209 may play an essential role in ensuring the redistribution of oil 82 through tanks 204 located within the shaft 22. At high rotational speeds of the shaft 22 the oil 82 contained in the tanks 204 may lag behind the rotation of said shaft 22. When this occurs the oil 82 may be subjected to shearing forces. Thereby causing said oil 82 to become unorganized under transient loading of the shaft 22. The fin apertures 209A may help prevent any one tank 204 from retaining more fluid or oil 82 than any other tank 204. The redistribution of oil 82 through the tanks 204 by the fins 209 and the fin apertures 209A has the added benefit of maintaining the shaft 22 properly balanced as said shaft 22 rotates. Thereby preventing vibrations that can cause damage to the shaft 22 or mechanisms mounted thereon.

Figure 15:
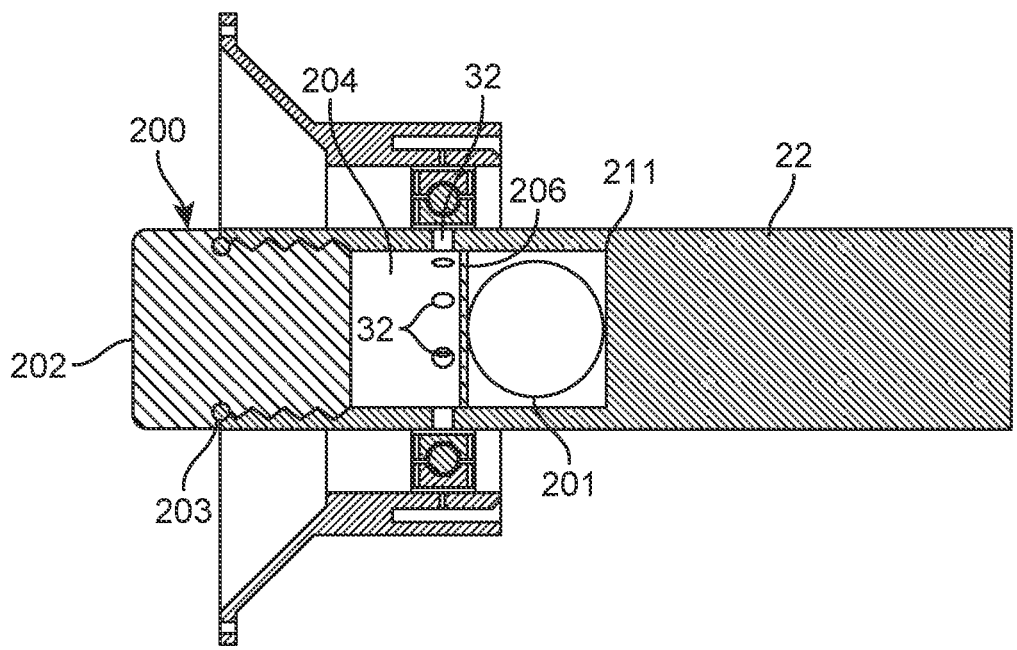
FIG. 15 shows a cross sectional side view of an alternate embodiment of the shaft 22. Wherein the shaft 22 includes a screen 206 mounted within the tank 204.
Figure 16:
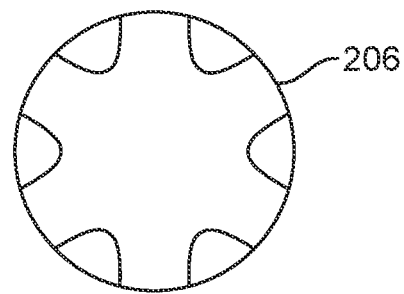
FIG. 16 is a front view of the screen 206 having a circular shape and a series of concave arcs about an interior of a perimeter edge of said screen 206.

Best depicted in FIG. 15-16, in yet another embodiment, the tank 204 may include a screen 206. The screen 206 may be perpendicularly mounted within the tank 204 with respect to the shaft. Wherein the screen 206 may be a flattened circular member made out of a rigid material. In one iteration the screen 206 may include a series of concave openings circumferentially located on an interior of a perimeter edge of said screen 206. The screen 206 may help prevent contaminants from the pod 201 from entering into the bearing assembly 40. The contaminants may include membrane 201A or reactive membrane 201B fragments that have remained solid after their respective melting temperatures has been reached. The screen 206 may also help prevent the shaft slots 32 from clogging. Thereby allowing for a more efficient distribution of the oil 82 into the bearing assembly 40.

Figure 17:
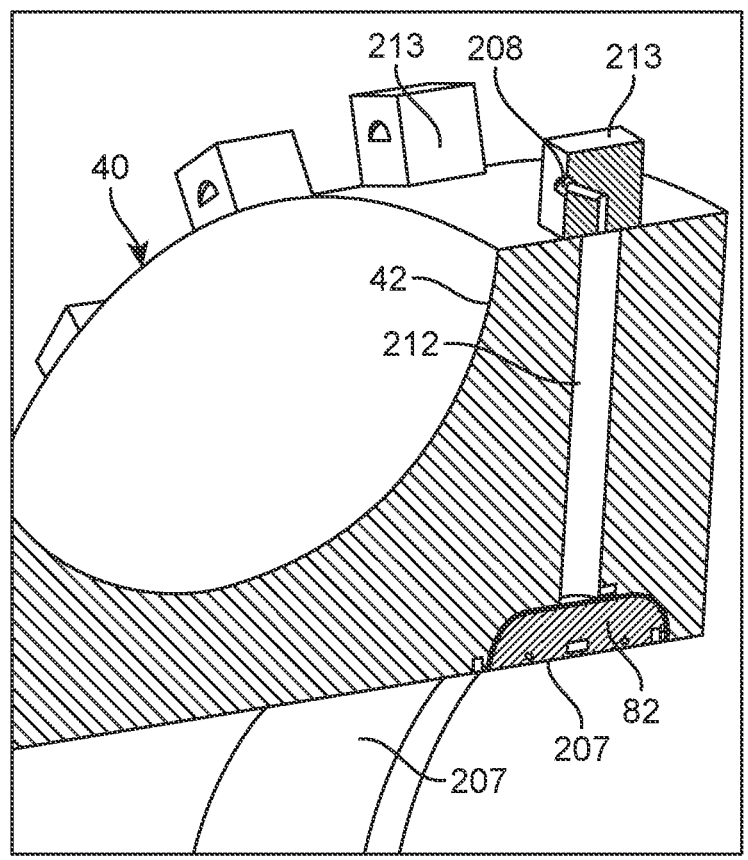
FIG. 17 illustrates a partial cross sectional view of an alternate embodiment of the inner race 42. The inner race 42 further including an annulus pod 207 located at a bottom inner race portion. The annulus pod 207 having an annular shape being located in alignment with nozzle channels 212 so the oil 82 contained therein may be expelled via nozzle 208.
Figure 21:
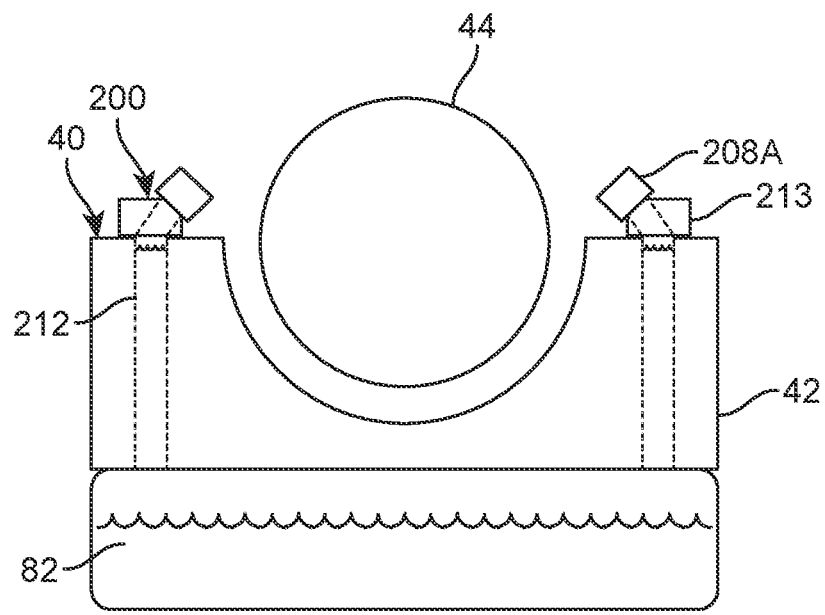
FIG. 21 depicts a cross sectional side view of the inner race 42. Wherein the inner race 42 includes radial slots 54 having a nozzle 208 located at a top end. The nozzle 208 including a nozzle plug 208A mounted thereon.
Figure 22:
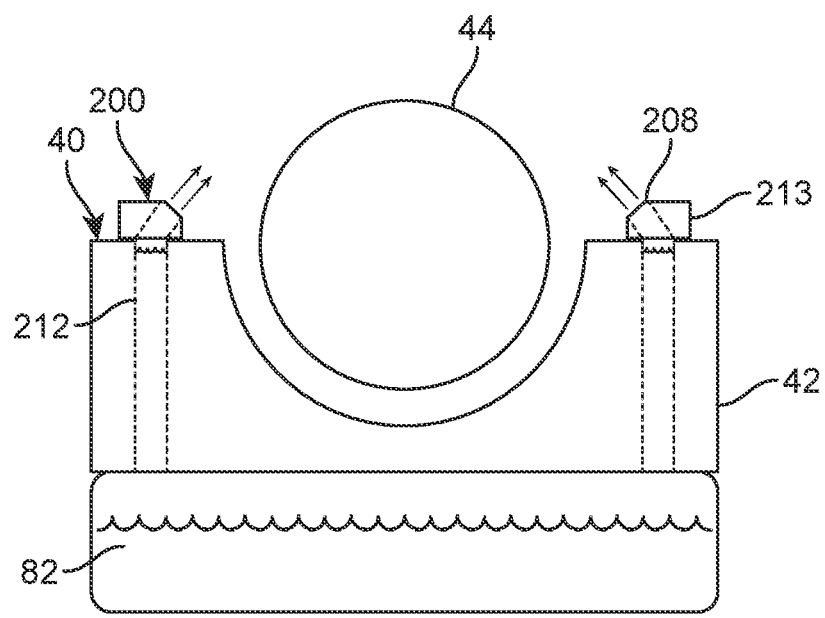
FIG. 22 shows a cross sectional side view of the inner race 42 wherein the nozzle 208 is shown expelling oil 82 onto bearing element 44.

As shown in FIG. 17, an alternate embodiment of the inner race 42 may include a nozzle 208 mounted thereon. The nozzle 208 may be housed within a nozzle enclosure 213. The nozzle enclosure 213 may be a cubic housing that helps direct the flow of oil 82 onto the exterior of the inner race 42. Thus, lubricating the bearing assembly 40. In one iteration the inner race 42 may include an annulus pod 207 mounted to an inner race bottom portion. The annulus pod 207 may be an annularly shaped container for oil 82. It may be suitable for the annulus pod 207 to also include a membrane that melts once a predetermined temperature is reached. The oil 82 released from the annulus pod 207 may travel through a nozzle channel 212 to be dispensed by the nozzle 208. As shown in FIG. 21 the nozzle 208 may further include a nozzle plug 208A. The nozzle plug 208A may be made out of a wax like material that melts once a predetermined temperature is reached.

Figure 20:
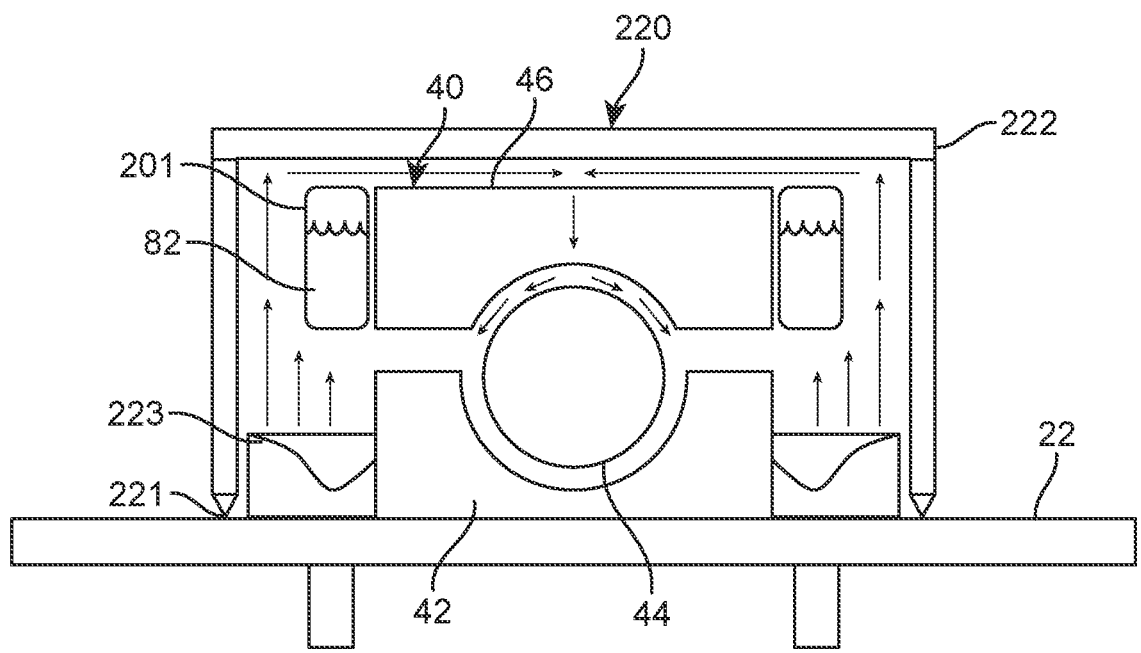
FIG. 20 is a cross sectional side view of a shrouding 222 of the mechanical seal assembly 220. The shrouding 222 mounted to an exterior of the shaft 22 while encasing the inner race 42 and outer race 46. The shrouding 222 helping to maintain the oil 82 released from the pod 201 therein as said oil 82 is circulated via an impeller 223.

Best illustrated in FIG. 20, the shaft 22 may include an alternate embodiment with a mechanical seal assembly 220 mounted thereon. The mechanical seal assembly 220 may include a mechanical seal 221. Wherein the mechanical seal 221 may further include a shrouding 222. It may be suitable for the shrouding 222 to be mounted circumferentially about the exterior of the shaft 22. The shrouding 222 may house the inner race 42, outer race 46, bearing element 44, pod 201, and the impeller 223. The pod 201 may be located on either side of the outer race 46. Once a predetermined temperature is reached the membrane 201A of the pod 201 may melt releasing the oil 82 stored therein. The impeller 223 may subsequently help disperse the oil 82 throughout the interior of the shrouding 222 to provide lubrication to the bearing element as the shaft 22 rotates. The impeller 223 may be a grooved member mounted in abutting contact to either side of the inner race 42.

Figure 24:
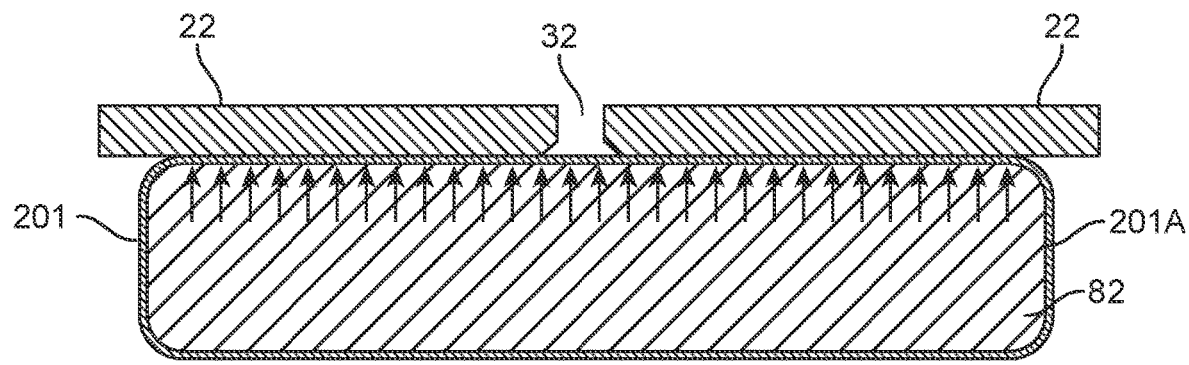
FIG. 24 illustrates a cross sectional side view of one iteration of the shaft 22. Wherein the pod 201 is shown in alignment with the shaft slot 32. The pod 201 is maintained in alignment with the shaft slot 32 via pressure forces acting upon it due to the rotation of the shaft 22.
Figure 25:
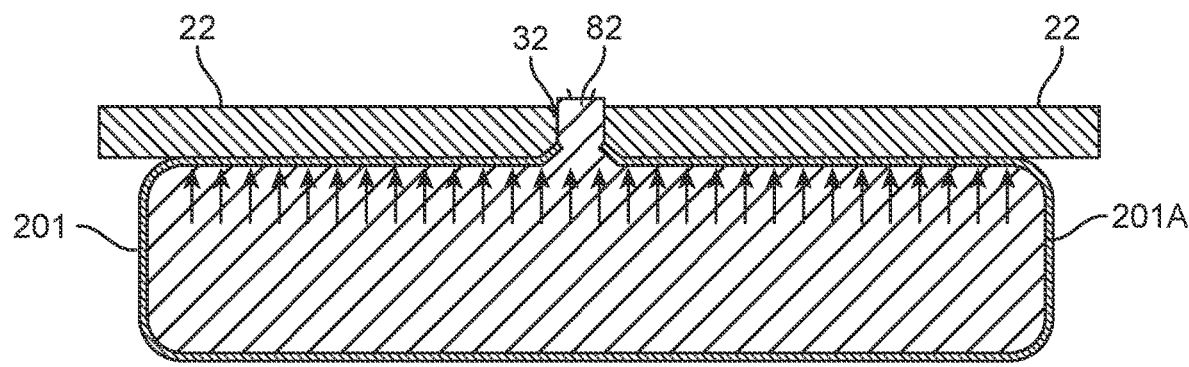
FIG. 25 demonstrates a cross sectional side view of the shaft 22. Wherein the pod 201 is in alignment with the shaft slot 32. Rotational forces acting upon the shaft 22 may present a predetermined amount of pressure that forces the pod 201 through the shaft slot 32. Thereby rupturing the membrane 201A and releasing the oil stored therein.

In one embodiment of the shaft 22, shown in FIGS. 24-25, it may be suitable for a pod 201 to be located in alignment with the shaft slots 32. In this iteration of the shaft 22 the pod 201 may be maintained in abutting contact to the shaft slot 32 via pressure or centrifugal forces. The pressure or centrifugal forces may be imparted upon the pod 201 via rotational forces introduced by the rotation of the shaft 22. The rotation of the shaft 22 may exert enough pressure on the pod 201 to force said pod 201 through the shaft slot 32. The forcing of the pod 201 through the shaft slot 32 may cause the membrane 201A to rupture, releasing the oil 82 stored therein. Thereby providing a mechanical alternative to the thermally induced release of the oil 82 as stated in previous embodiments.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An oil distribution system, comprising:
   a) a shaft assembly including a shaft, said shaft including shaft slots disposed along a circumference of said shaft, at least one pod containing oil within and secured within said shaft, said at least one pod melting when a predetermined temperature is reached within said shaft to release said oil from said at least one pod; and
   b) a bearing assembly secured about the circumference of said shaft, said bearing assembly including a bearing element, an outer race, and an inner race, said inner race including oil distribution slots, said shaft slots aligning with said oil distribution slots of said inner race to permit the oil from the shaft to be pumped towards the inner race to flood the bearing assembly with the oil for lubrication thereof, said shaft assembly is subject to rotational force when in operation, thereby allowing said oil to be pumped.

2. The oil distribution system of claim 1 wherein said at least one pod is secured within a tank in the shaft, the tank is between a cap and a wall each being located at opposing sides of said tank.

3. The oil distribution system of claim 2 wherein said wall is mounted within the shaft with adhesive or welding.

4. The oil distribution system of claim 2 wherein said at least one pod is cylindrical.

5. The oil distribution system of claim 2 wherein said at least one pod is spherical.

6. The oil distribution system of claim 2 wherein said at least one pod is cubic.

7. The oil distribution system of claim 2 wherein said tank includes a screen perpendicularly mounted within the shaft.

8. The oil distribution system of claim 7 wherein said screen is circular and includes a series of concave arcs circumferentially disposed about an interior of a screen perimeter edge.

9. The oil distribution system of claim 2 wherein said wall includes chamfered edges.

10. The oil distribution system of claim 1 wherein said shaft includes fins, said fins including fin apertures to facilitate agitating the oil contained within the shaft.

11. The oil distribution system of claim 1 wherein said inner race includes nozzles to dispense oil onto the bearing element.

12. The oil distribution system of claim 11 wherein said nozzles include a nozzle plug mounted thereon, said nozzle plug melting when a secondary predetermined temperature is reached.

13. The oil distribution system of claim 1 wherein said at least one pod includes a membrane, said membrane further including a reactive membrane, the reactive membrane being made of a material with a lower melting point than that of said membrane to facilitate the expulsion of oil contained within the at least one pod in the direction of the reactive membrane.

14. The oil distribution system of claim 1 wherein said at least one pod is annular.

15. The oil distribution system of claim 14 wherein said at least one pod is received by an inner race bottom portion.

16. The oil distribution system of claim 1 wherein said bearing assembly is housed within a shrouding that includes a mechanical seal to facilitate mounting said shrouding to an exterior of the shaft.

17. The oil distribution system of claim 16 wherein said shrouding includes an impeller mounted therein, the impeller being located on either side of the inner race.

18. The oil distribution system of claim 17 wherein said outer race includes at least one pod mounted thereon, the oil contained within the at least one pod being dispersed within a shrouding interior via the impeller.

19. The oil distribution system of claim 1 wherein the shaft is operatively engaged to a turbine causing rotation of the shaft from the influence of the turbine, thereby providing said rotational force to said shaft.

20. The oil distribution system of claim 19 wherein said at least one pod is located in alignment with the shaft slots so that when said predetermined temperature is reached within said shaft to release said oil from said at least one pod, said oil is subsequently expelled through the shaft slots due to the rotational force exhibited by the shaft.

* * * * *